(12) United States Patent
Kasamatsu et al.

(10) Patent No.: US 10,295,281 B2
(45) Date of Patent: May 21, 2019

(54) FIN-TUBE TYPE OF HEAT EXCHANGER

(71) Applicant: RINNAI CORPORATION, Aichi (JP)

(72) Inventors: Kei Kasamatsu, Nagoya (JP); Akifumi Nishino, Nagoya (JP)

(73) Assignee: RINNAI CORPORATION, Aichi (JP)

( * ) Notice: Subject to any disclaimer, the term of this patent is extended or adjusted under 35 U.S.C. 154(b) by 0 days.

(21) Appl. No.: 15/919,612

(22) Filed: Mar. 13, 2018

(65) Prior Publication Data

US 2018/0306529 A1    Oct. 25, 2018

(30) Foreign Application Priority Data

Apr. 5, 2017   (JP) .................. 2017-075336

(51) Int. Cl.
| | | |
|---|---|---|
| *F28F 1/32* | (2006.01) | |
| *F28D 1/047* | (2006.01) | |
| *F28F 9/26* | (2006.01) | |
| *F28F 9/00* | (2006.01) | |
| *F28D 1/04* | (2006.01) | |
| *B23K 1/00* | (2006.01) | |
| *F28D 21/00* | (2006.01) | |

(52) U.S. Cl.
CPC .............. *F28F 9/26* (2013.01); *B23K 1/0012* (2013.01); *F28D 1/0426* (2013.01); *F28D 1/0477* (2013.01); *F28F 1/32* (2013.01); *F28F 1/325* (2013.01); *F28F 9/001* (2013.01); *F28D 2021/0024* (2013.01); *F28F 2275/04* (2013.01); *F28F 2275/045* (2013.01)

(58) Field of Classification Search
CPC .......... F28F 1/325; F28F 2275/04; F28F 1/32; F28F 9/001; F28F 9/26; F28F 2275/045; F28D 1/0426; F28D 1/0477; F28D 2021/0024; B23K 1/0012
USPC .................................. 165/79, 151, 149, 182
See application file for complete search history.

(56) References Cited

U.S. PATENT DOCUMENTS

| | | | | | |
|---|---|---|---|---|---|
| 1,940,963 | A | * | 12/1933 | McIntyre | .................. F28B 1/00 165/150 |
| 2,138,091 | A | * | 11/1938 | Cortines | .................. F28F 9/22 165/151 |

(Continued)

FOREIGN PATENT DOCUMENTS

| | | |
|---|---|---|
| JP | 05-141889 A | 6/1993 |
| JP | 2006-200830 A | 8/2006 |

*Primary Examiner* — Leonard R Leo
(74) *Attorney, Agent, or Firm* — Cermak Nakajima & McGowan LLP; Tomoko Nakajima

(57) ABSTRACT

A fin-tube type of heat exchanger has: a plurality of fins laminated to one another; a housing for containing therein the fins; and a heat transfer tube penetrating the fins in a fin-laminating direction and also penetrating side plates on both sides of the housing. A heat transfer tube through hole is formed in one-side side plate of the housing by a burred hole having a tubular flange part protruded into the housing. Each fin has a brazing material insertion hole adjacent to the heat transfer tube through hole. That portion of a brazing material which protrudes from the brazing material insertion hole of the outermost fin closest to the one-side side plate part toward the one-side side plate part gets molten. The tubular flange part has a cutout part formed, at a circumferential position facing the brazing material insertion hole, by partly cutting away the tubular flange part.

2 Claims, 6 Drawing Sheets

(56) References Cited

U.S. PATENT DOCUMENTS

| | | | | | |
|---|---|---|---|---|---|
| 2,532,301 | A | * | 12/1950 | Hayward | F25B 39/04 |
| | | | | | 165/150 |
| 2,620,171 | A | * | 12/1952 | Dubin | F28F 1/34 |
| | | | | | 165/182 |
| 2,976,022 | A | * | 3/1961 | Gannon | F28D 1/053 |
| | | | | | 165/182 |
| 3,771,595 | A | * | 11/1973 | Slaasted | F28F 1/02 |
| | | | | | 165/151 |
| 6,802,362 | B2 | * | 10/2004 | Wenger | F28D 15/0233 |
| | | | | | 165/182 |
| 7,121,327 | B2 | * | 10/2006 | Chen | F28D 15/02 |
| | | | | | 165/104.34 |
| 2002/0117295 | A1 | * | 8/2002 | Shen | F28F 1/02 |
| | | | | | 165/182 |

* cited by examiner

FIN-TUBE TYPE OF HEAT EXCHANGER

BACKGROUND OF THE INVENTION

1. Field of the Invention

The present invention relates to a fin-tube type of heat exchanger provided with: a plurality of laminated fins; a housing for containing therein the fins; and a heat transfer tube which penetrates the fins in a direction of laminating the fins (hereinafter referred to as "a fin-laminating direction") and which also penetrates side plates on both sides, in the fin-laminating direction, of the housing.

2. Background of the Related Art

In this kind of fin-tube type of heat exchanger each of the fins was provided, in the prior art, with holes for inserting therethrough brazing material (hereinafter referred to as "brazing material insertion holes") adjacent to through holes for inserting therethrough the heat transfer tube (hereinafter referred to as "heat transfer tube through holes") which are formed in each of the fins. The brazing material inserted through the brazing material insertion holes are then caused to be molten, thereby brazing the heat transfer tube to the heat transfer tube through holes (see, for example, JP-1993-141889 A).

In addition, there is known the following prior art. Namely, a heat transfer tube through hole which is formed in a side plate on at least one side (hereinafter also referred to as "one-side side plate"), in the fin-laminating direction, of the housing is constituted by a burred hole (i.e., a hole formed by burring) having a tubular flange part protruded into the housing. That portion of the brazing material which protrudes from the brazing material insertion hole in the outermost fin closest to the one-side side plate part is caused to get molten, whereby the heat transfer tube is brazed to the tubular flange part (see, for example, JP-2006-200830 A, paragraph [0015]).

Here, much of the brazing material that protrudes from the brazing material insertion hole of the outermost fin toward the side plate part of the housing will flow down, when molten, along the circumferential surface of the tubular flange part. Therefore, the proportion of the brazing material which permeates from the front end of the tubular flange part into the clearance between the tubular flange part and the heat transfer tube and which contributes to the brazing of the heat transfer tube becomes small. As a result, poor brazing of the heat transfer tube is likely to occur and, consequently, the combustion exhaust gas that flows into the housing sometimes leaks outside from the clearance between the tubular flange part and the heat transfer tube.

SUMMARY

Problems that the Invention is to Solve

In view of the above-mentioned points, this invention has a problem of providing a fin-tube type of heat exchanger in which the heat exchange tube can be brazed well to the tubular flange part in the heat transfer tube through hole of the side plate part of the housing.

Means for Solving the Problems

In order to solve the above-mentioned problems, this invention is a fin-tube type of heat exchanger comprising: a plurality of fins laminated to one another; a housing for containing therein the fins; a heat transfer tube which penetrates the fins in a fin-laminating direction and which also penetrates side plate parts on both sides, in the fin-laminating direction, of the housing. A heat transfer tube through hole which is formed in an at least one-side side plate part, in the fin-laminating direction, of the housing is constituted by a burred hole having a tubular flange part protruded into the housing. Each of the fins has a brazing material insertion hole formed adjacent to the heat transfer tube through hole formed in each of the fins. That portion of a brazing material which protrudes from the brazing material insertion hole in an outermost fin closest to the one-side side plate part toward the one-side side plate part is caused to get molten so that the heat transfer tube is brazed to the tubular flange part. The tubular flange part has formed, at a position of a circumferential portion facing the direction in which the brazing material insertion hole is present, a cutout part in which a part of the tubular flange part has been cut out.

Here, brazing is performed by placing a sub-assembly of a heat exchanger into a furnace in a posture in which the brazing material insertion hole is positioned above the heat transfer tube insertion hole. According to this invention, the cutout part formed in the tubular flange part of the heat transfer tube through hole in the side plate part of the housing faces the brazing material insertion hole that is positioned above. Therefore, when that portion of the brazing material which protrudes from the brazing material insertion hole in the outermost fin to the side plate part of the housing gets molten, the molten brazing material will, for the most part, flow down to the cutout part. Then, the molten brazing material will get permeated from the edge of the cutout part into the clearance between the tubular flange part and the heat transfer tube. Therefore, the heat transfer tube can well be brazed to the tubular flange part.

Further, in this invention, it is preferable that the height of protrusion, into the housing, of the tubular flange part at a predetermined circumferential portion inclusive of the portion in which the cutout part is formed, is arranged to be larger than the height of protrusion, into the housing, of the tubular flange part at other circumferential portions. According to this arrangement, the edges on both circumferential sides of the cutout part can be made longer. Therefore, the amount of permeation of the molten brazing material from the edges into the clearance between the tubular flange part and the heat transfer tube increases, and the reliability of the brazing can be improved.

Further, according to this invention, provided that a product of an area of the cutout part and a thickness of the tubular flange part is defined to be a volume of the cutout part, the volume of the cutout part is preferably smaller than the volume of that portion of the brazing material which protrudes from the brazing material insertion hole in the outermost fin toward the one-side side plate part. According to this arrangement, when the brazing material that is protruded from the brazing material insertion hole in the outermost fin, gets molten and flows down to the cutout part, the molten brazing material does not stay in the central part of the cutout part, but will reach the edges of the cutout part while filling the cutout part with the molten brazing material. Therefore, the molten brazing material surely permeate from the edges to the clearance between the tubular flange part and the heat transfer tube, and the reliability of the brazing can be improved.

DESCRIPTION OF THE PREFERRED EMBODIMENTS

Figure 1:
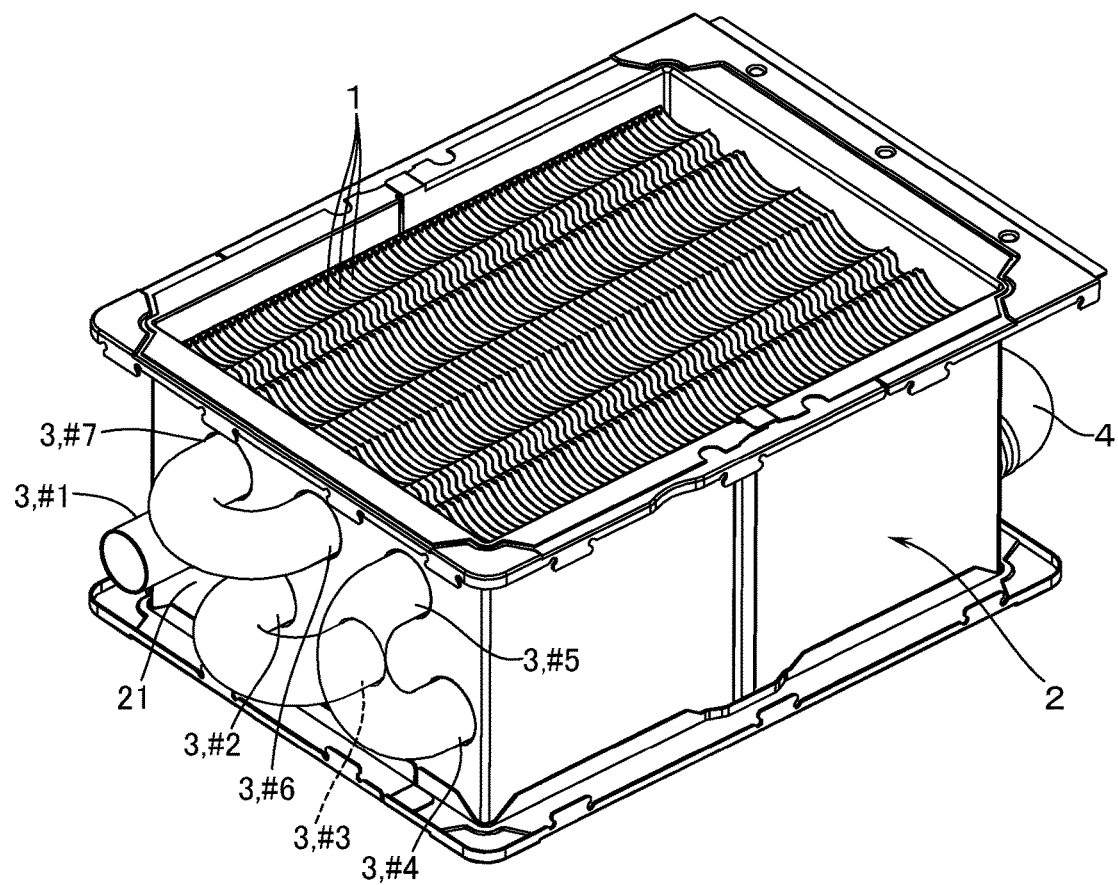
FIG. 1 is a perspective view of a fin-tube type of heat exchanger according to an embodiment of this invention.
Figure 2:
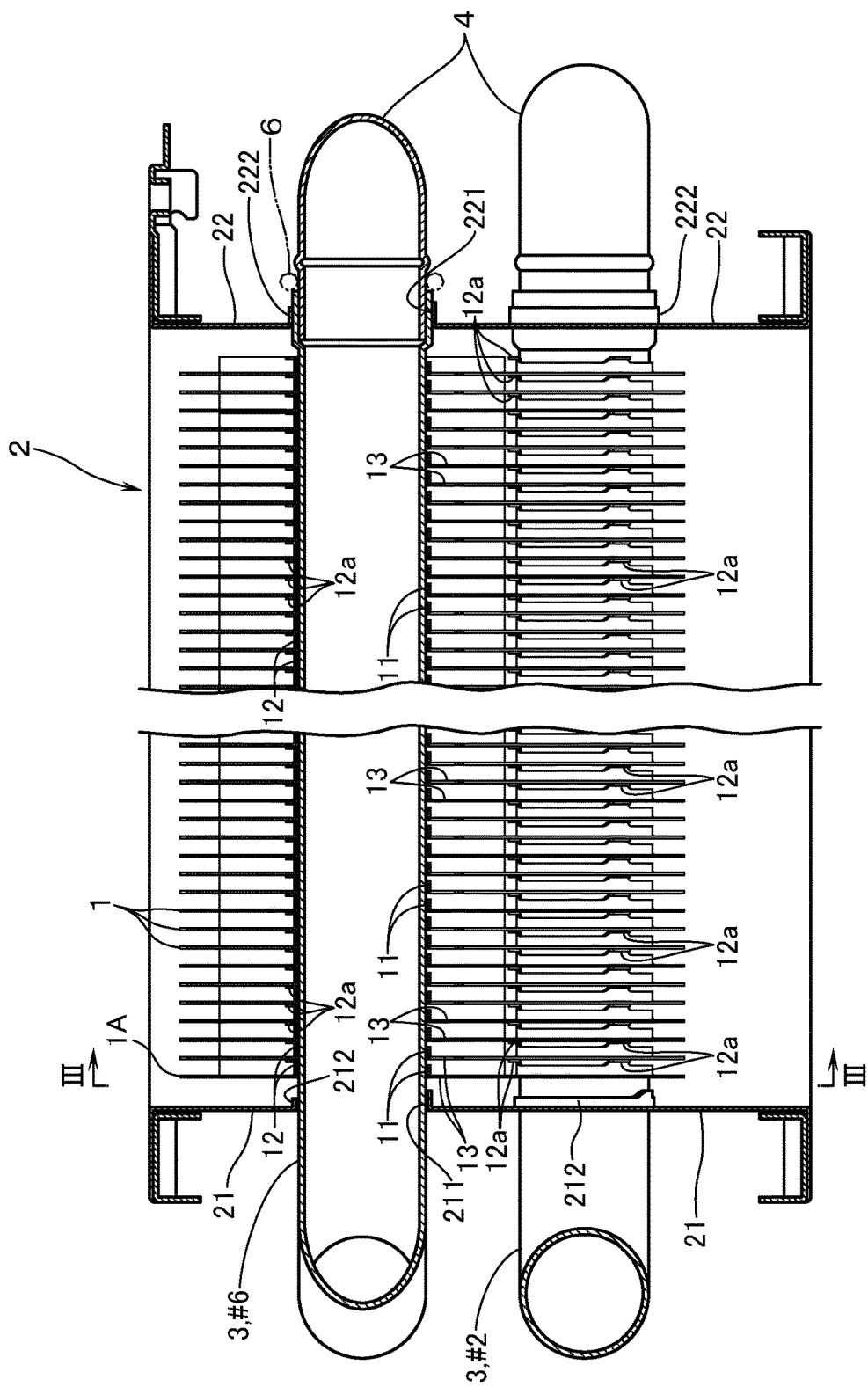
FIG. 2 is a sectional side view of a fin-tube type of heat exchanger according to the embodiment.

With reference to FIGS. 1 and 2, the fin-tube type of heat exchanger according to the embodiment of this invention is provided with a plurality of fins 1 laminated to one another; a housing 2 which contains therein the fins 1, and through inside of which the combustion gas from the burner flows; and a plurality of heat transfer tubes 3 which penetrate the fins 1 in the fin-laminating direction, and which also penetrate side plate parts 21, 22 on both sides, in the fin-laminating direction, of the housing 2. Hereinafter, description will be made on condition that the fin-laminating direction is defined as a front-to-back direction.

Figure 3:
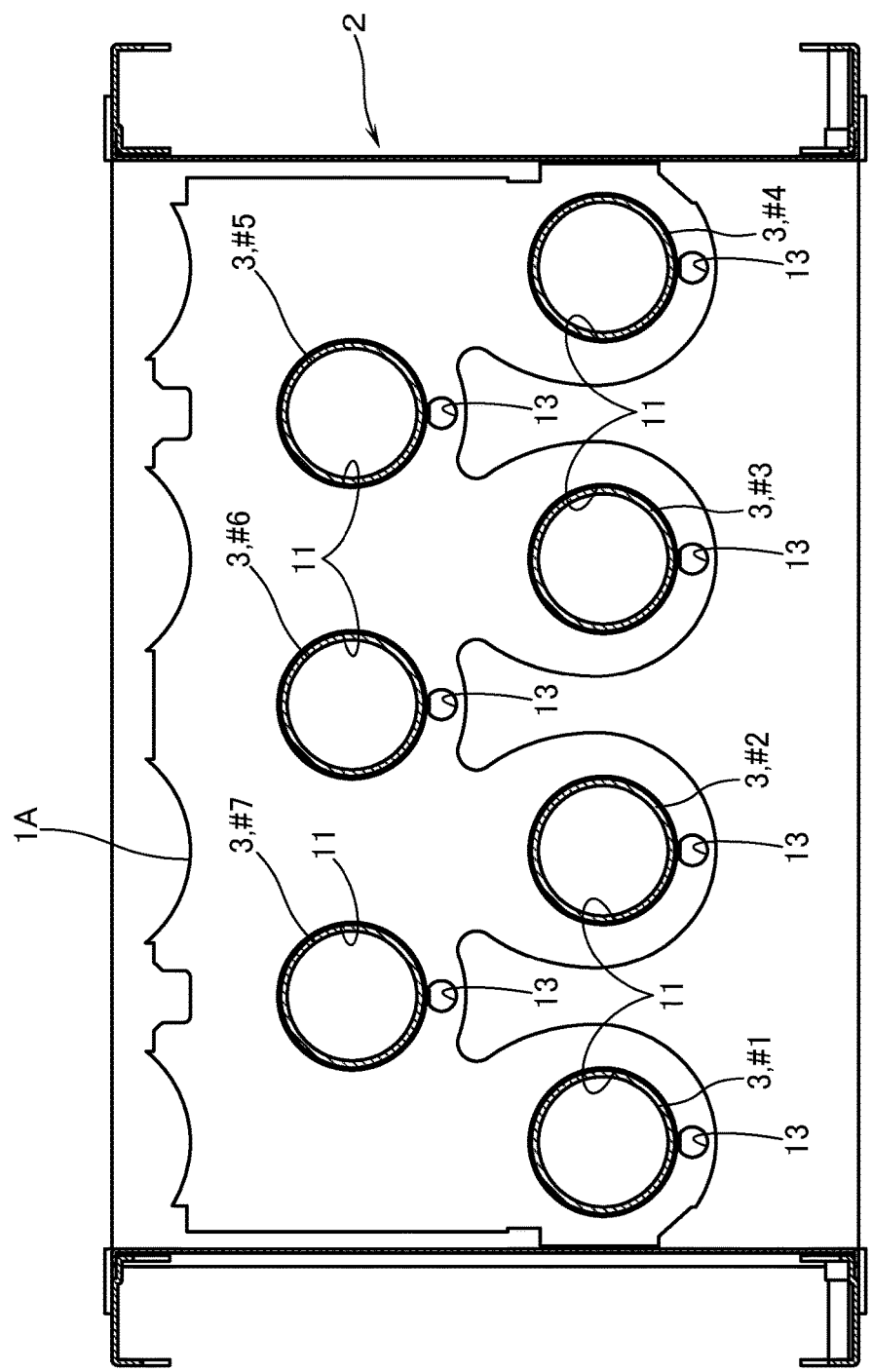
FIG. 3 is a sectional view cut away along the line III-III in FIG. 2.

With reference also to FIG. 3, the heat transfer tubes 3 are disposed in four tubes of #1 to #4 on the lower side, and three tubes of #5 to #7 on the upper side, i.e., 7 tubes in all. Then, the #2 and #3 heat transfer tubes 3, 3; #4 and #5 heat transfer tubes 3, 3; and #6 and #7 heat transfer tubes 3, 3 are constituted by one tube that is bent on the outside of the front-side side plate 21 of the housing 2. And on the outside of the rear-side side plate 22 of the housing 2, #1 and #2 heat transfer tubes 3, 3; #3 and #4 heat transfer tubes 3, 3, and #5 and #6 heat transfer tubes 3, 3 are connected together through respective U-bends 4. According to this arrangement, the heat transfer tubes 3 from #1 to #7 are connected together in series. Cold water that flows in from the #1 heat transfer tube 3 is subjected to heat exchanging with the combustion gas, and is supplied as hot water out of the #7 heat transfer tube 3.

Figure 4:
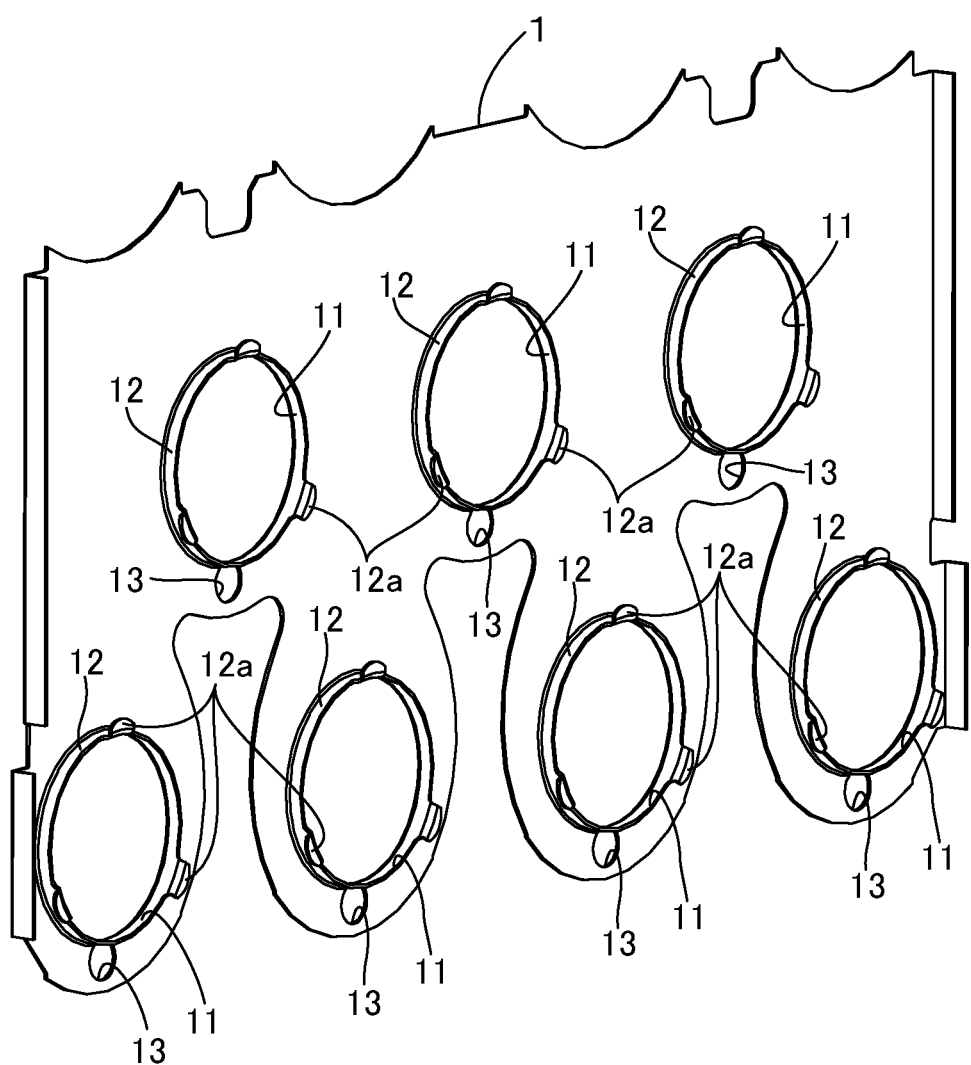
FIG. 4 is a perspective view of a fin to be used in the fin-tube type of heat exchanger according to the embodiment.
Figure 5:
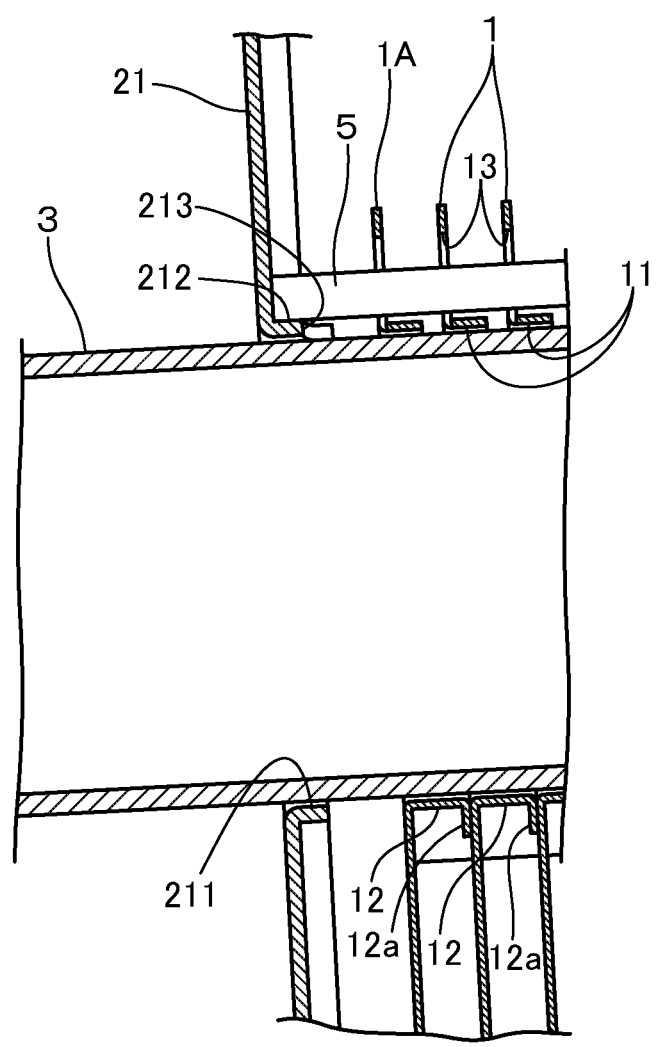
FIG. 5 is a cut away side view showing a state in which brazing is performed of an important portion of the fin-tube type of heat exchanger according to the embodiment.

Each of the heat transfer tube through holes 11 which are formed in each fin 1 is constituted, as clearly shown in FIGS. 4 and 5, by a burred hole having a tubular flange part 12. In a plurality of circumferential positions at a front end of the tubular flange part 12, there are disposed contact parts 12a which come into contact with an adjoining fin 1 to thereby keep constant the distance between each of the fins 1, 1. In addition, each of the fins 1 has formed a brazing material insertion hole 13 adjacent to the lower portion of each heat transfer tube through hole 11. Then, a sub-assembly of the heat exchanger is placed into a furnace in an inverted (upside-down) posture as shown in FIG. 5 so that each of the brazing material insertion holes 13 is positioned above each of the heat transfer tube through holes 11. Bar-shaped brazing materials 5 that have been inserted, in advance, into the brazing material insertion holes 13 in a plurality of fins 1 are caused to get molten so that the molten brazing material gets permeated into the clearance between the tubular flange part 12 of the heat transfer tube 11 and the heat transfer tube 3. The heat transfer tube 3 can thus be brazed to the tubular flange part 12.

In addition, each of the heat transfer tube through holes 211 that are formed in the front-side side plate part 21 of the housing 2 is constituted by a burred hole having a tubular flange part 212 protruded into the housing 2. Then, by melting that part of the brazing material 5 which protrudes from the brazing material insertion hole 13 of the outermost fin 1A closest to the front-side side plate part 21 toward the front-side side plate part 21, the heat transfer tube 3 is brazed to the tubular flange part 212 of the heat transfer through hole 211.

Further, each of the heat transfer tube through holes 221 that are formed in the rear-side side plate 22 of the housing 5 is constituted by a burred hole having a tubular flange part 222 protruded outside the housing 2. Then, a U-bend 4 is fitted into an inside of the rear end part of the heat transfer tube 3, and also a ring-shaped brazing material 6 (see FIG. 2) is fitted onto an outside of the U-bend 4. By melting the brazing material, the U-bend 4 is brazed to the heat transfer tube 3, and also the heat transfer tube 3 is brazed to the tubular flange part 222.

Figure 6:
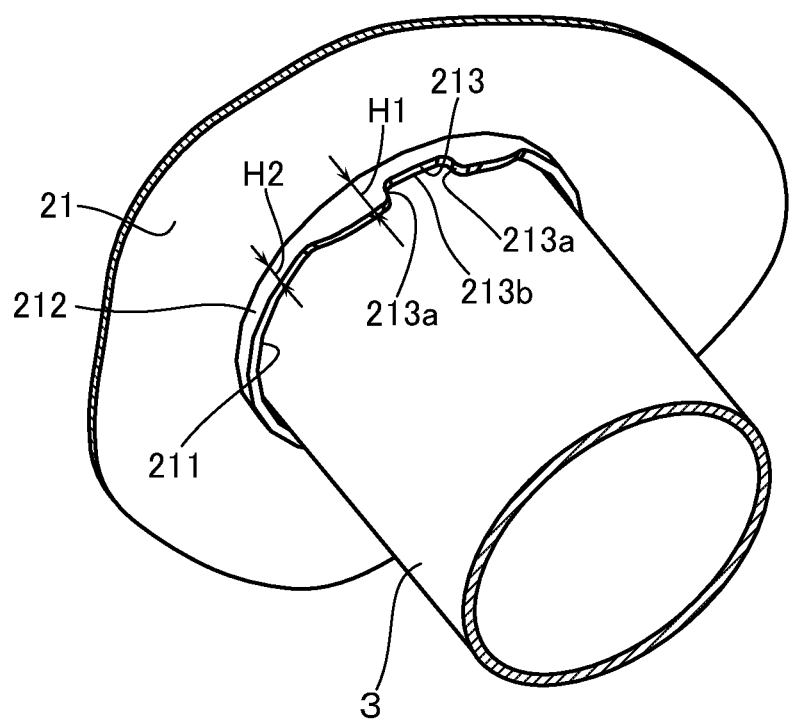
FIG. 6 is a perspective view of an essential part of the fin-tube type of heat exchanger according to the embodiment.

Here, the tubular flange part 212 of each of the heat transfer tube through holes 211 in the front-side side plate part 21 has formed therein, as clearly shown in FIG. 6, in a circumferential portion facing the direction in which the brazing material insertion hole 13 is present, a cutout part 213 in which the tubular flange part 212 is partially cut out. When the sub-assembly of the heat exchanger is inverted into an upside-down posture so that each of the brazing material insertion holes 13 is positioned above each of the heat transfer tube through holes 11, the cutout part 213 will look at the side of the brazing material insertion holes 13 positioned above. Therefore, when that portion of the brazing material 5 which protrudes from the brazing material insertion hole 13 in the outermost fin 1A to the front-side side plate part 21 gets molten, much of the molten brazing material will flow down into the cutout part 213. In this manner, since the molten brazing material from the edges 213a of circumferentially both sides of the cutout part 213, and from the edge 213b of the front end of the cutout part 213 permeates into the clearance between the tubular flange part 212 and the heat transfer tube 3, good brazing of the heat transfer tube 3 can be performed to the tubular flange part 212.

By the way, in performing the brazing, the sub-assembly of the heat exchanger is, as described above, inverted upside down and also into an inclined posture in which the front portion is slightly down. According to this arrangement, the front end of the brazing material 5 comes into contact with the front-side side plate part 21 and the length of protrusion of the brazing material 5 beyond the brazing material insertion hole 13 of the outermost fin 1A can be controlled to a constant length. Further, the molten brazing material that has flown down to the upper surface of the heat transfer tube 3 will flow, along the upper surface of the heat transfer tube 3, into the cutout part 213, thereby contributing to the brazing of the heat transfer tube 3 to the tubular flange part 212.

Furthermore, according to this embodiment, the height of protrusion H1, into the housing 2, of a predetermined circumferential portion inclusive of the portion in which the cutout part 213 of the tubular flange part 212 is formed, is arranged to be larger than the height of protrusion, into the housing 2, of the tubular flange part 212 at other circumferential portions. According to this arrangement, the edges 213a on both circumferential sides of the cutout part 213 can be made longer. As a consequence, the amount of permeation of the molten brazing material from the edges 213a into the clearance between the tubular flange part 212 and the heat transfer tube 3 becomes larger, thereby improving the reliability of brazing.

Still furthermore, according to this embodiment, provided that a product of an area of the cutout part 213 and a thickness of the flange part 212 is defined to be a volume of the cutout part, the volume of the cutout part is made smaller than the volume of that portion of the brazing material 5 which protrudes from the brazing material insertion hole 13 of the outermost fin 1A to the front-side side plate part 21. According to this arrangement, when the brazing material protruding from the brazing material insertion hole 13 of the outermost fin 1A toward the front-side side plate part 21 gets molten and flows down to the cutout part 213, the molten brazing material does not stay in the central part of the cutout part 213, but will reach the edges 213a, 213b of the cutout part 213 while filling the cutout part 213 with the molten brazing material. Accordingly, the molten brazing material surely permeates, from the edges 213a, 213b to the clearance between the tubular flange part 212 and the heat transfer tube 3, thereby improving the reliability of brazing.

Description has so far been made of an embodiment of this invention with reference to the drawings. This invention shall, however, not be limited to the above. For example, in the above-mentioned embodiment, the cutout part 213 is constituted by a notched part, but the notched part 213 can alternatively be constituted by holes. Further, in the above-mentioned embodiment, the tubular flange part 212 protruded into the housing 2 is disposed only in the front-side side plate part 21. However, depending on the constitution of the heat exchanger, a tubular flange part that is protruded into the housing 2 may be disposed also in the rear-side side plate 22. Cutout part similar to the cutout part 213 of the above-mentioned embodiment may also be formed in this tubular flange part.

EXPLANATION OF THE MARKS 1 fin
1A outermost fin
11 heat transfer tube through hole
13 brazing material insertion hole
2 housing
21 side plate part on one side
211 heat transfer tube through hole
212 tubular flange part
213 cutout part
3 heat transfer tube
5 brazing material

What is claimed is:

1. A fin-tube type of heat exchanger comprising:
a plurality of fins laminated to one another;
a housing for containing therein the fins;
a heat transfer tube which penetrates the fins in a fin-laminating direction and which also penetrates side plate parts on both sides, in the fin-laminating direction, of the housing,
wherein a heat transfer tube through hole which is formed in an at least one-side side plate part, in the fin-laminating direction, of the housing is constituted by a burred hole having a tubular flange part protruded into the housing,
wherein each of the plurality of fins has a brazing material insertion hole formed adjacent to a heat transfer tube through hole formed in each of the plurality of fins;
wherein that portion of a brazing material which protrudes from the brazing material insertion hole in an outermost fin closest to the one-side side plate part toward the one-side side plate part is caused to get molten so that the heat transfer tube is brazed to the tubular flange part; and
wherein the tubular flange part has formed, at a position of a circumferential portion facing the direction in which the brazing material insertion hole is present, a cutout part in which a part of the tubular flange part has been cut out,
wherein a height of protrusion, into the housing, of the tubular flange part at predetermined circumferential portions adjacent to both circumferential sides of the portions in which the cutout part is formed, is arranged to be larger than a height of protrusion, into the housing, of the tubular flange part at other circumferential portions exclusive of the portion in which the cutout part is formed and the predetermined circumferential portions, and
wherein a total circumferential length of the tubular flange part at the predetermined circumferential portions and the portion in which the cutout part is formed, is arranged to be shorter than a total circumferential length of the tubular flange part at the other circumferential portions.

2. The fin-tube type of heat exchanger according to claim 1, wherein, provided that a product of an area of the cutout part and a thickness of the tubular flange part is defined to be a volume of the cutout part, the volume of the cutout part is smaller than the volume of that portion of the brazing material which protrudes from the brazing material insertion hole in the outermost fin toward the side plate part on the one side.

* * * * *